United States Patent [19]
Collén

[11] Patent Number: 6,003,197
[45] Date of Patent: Dec. 21, 1999

[54] LEAK-PROOF CONTAINER VALVE DEVICE

[76] Inventor: Edvard Collén, Nybrogatan 43, 3tr, S-114 39 Stockholm, Sweden

[21] Appl. No.: 09/011,460

[22] PCT Filed: Jun. 5, 1997

[86] PCT No.: PCT/SE97/00988

§ 371 Date: Feb. 12, 1998

§ 102(e) Date: Feb. 12, 1998

[87] PCT Pub. No.: WO97/47905

PCT Pub. Date: Dec. 18, 1997

[30] Foreign Application Priority Data

Jun. 14, 1996 [SE] Sweden .................................. 9602348

[51] Int. Cl.$^6$ ..................................................... F16K 17/36
[52] U.S. Cl. .................................. 15/353; 137/43; 137/45; 137/202
[58] Field of Search .................. 15/353; 137/43, 137/45, 202

[56] References Cited

U.S. PATENT DOCUMENTS

| | | | |
|---|---|---|---|
| 2,763,886 | 9/1956 | Brown et al. .................. | 15/353 X |
| 4,138,761 | 2/1979 | Nauta . | |
| 4,934,021 | 6/1990 | Lenting ........................ | 15/353 |
| 4,939,809 | 7/1990 | Park ............................. | 15/353 X |
| 5,086,537 | 2/1992 | McDowell et al. . | |
| 5,377,383 | 1/1995 | Christensen . | |
| 5,687,753 | 11/1997 | Doll ............................. | 137/43 |

FOREIGN PATENT DOCUMENTS

| | | |
|---|---|---|
| 0 277 869 | 8/1988 | European Pat. Off. . |
| 0598952 A1 | 6/1994 | European Pat. Off. . |
| 1155 064 | 9/1963 | Germany . |

*Primary Examiner*—Gerald A. Michalsky
*Attorney, Agent, or Firm*—Burns, Doane, Swecker & Mathis, L.L.P.

[57] ABSTRACT

A valve device is adapted to be provided on top of a container (1) to prevent the flow of a liquid from said container. Said container may form a part of a cleaning device. The valve device comprises a passage (10) extending in a direction (x) being essentially vertical when the valve device is in a normal working position and having an orifice (11) at one end. The orifice is surrounded by a surface (14). Moreover, the valve device comprises a disk (15) having a disk diameter exceeding the diameter of said orifice and support means (17, 18) to support the disk (15) beneath said orifice (11) at a distance from said surface such that the disk is movable to abut said surface when said direction (x) deviates from said vertical direction by a predetermined angle.

19 Claims, 3 Drawing Sheets

Fig. 3
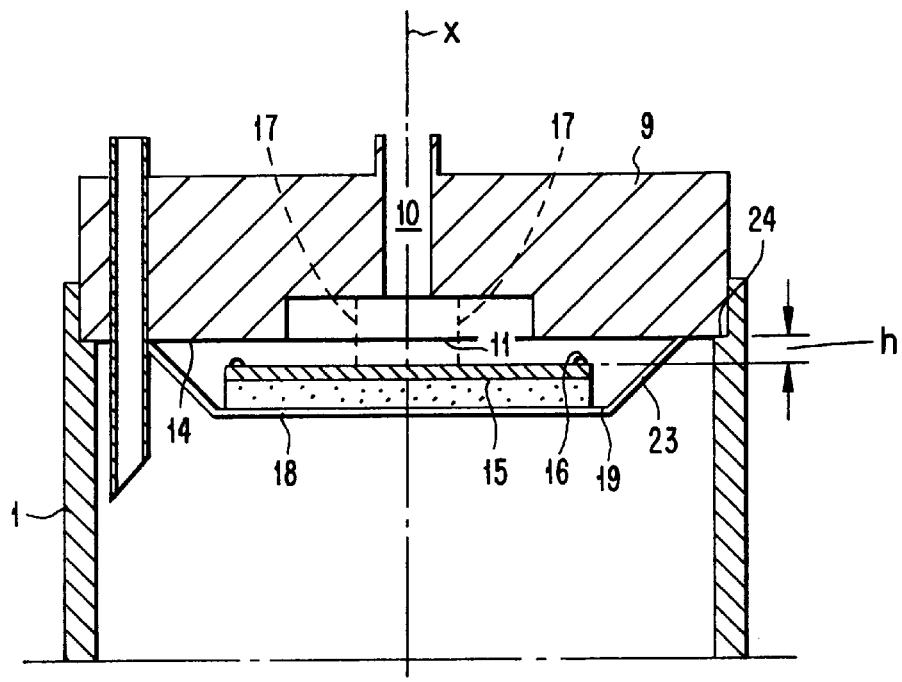
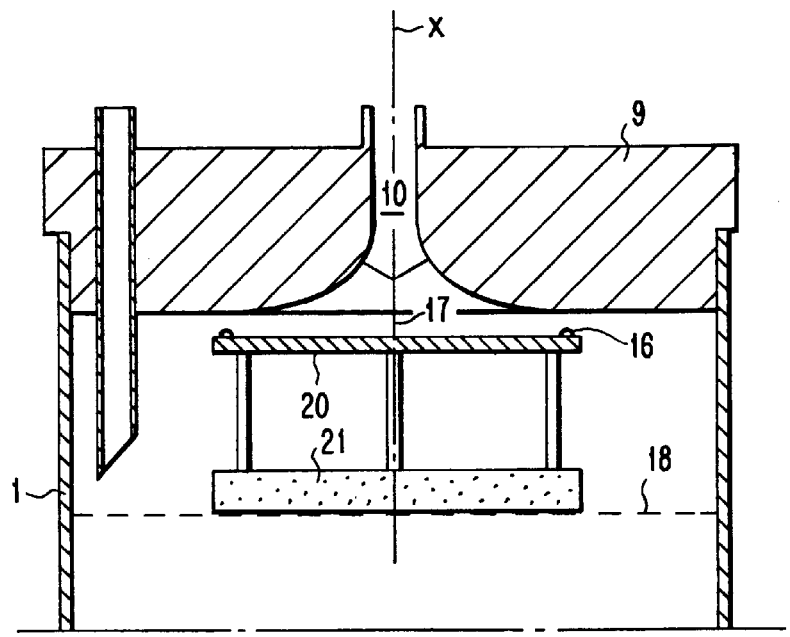
Fig. 4

Fig. 5
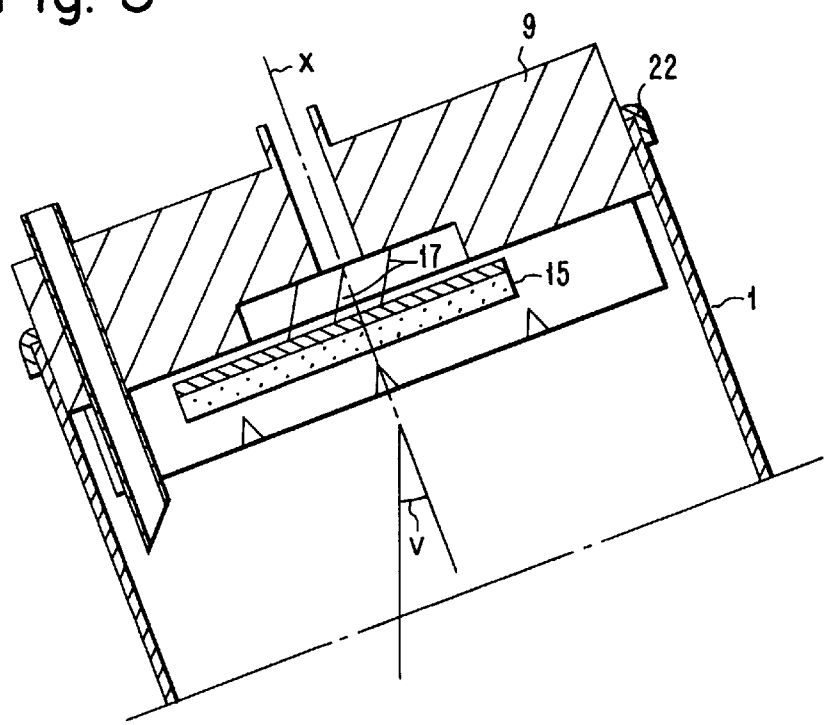
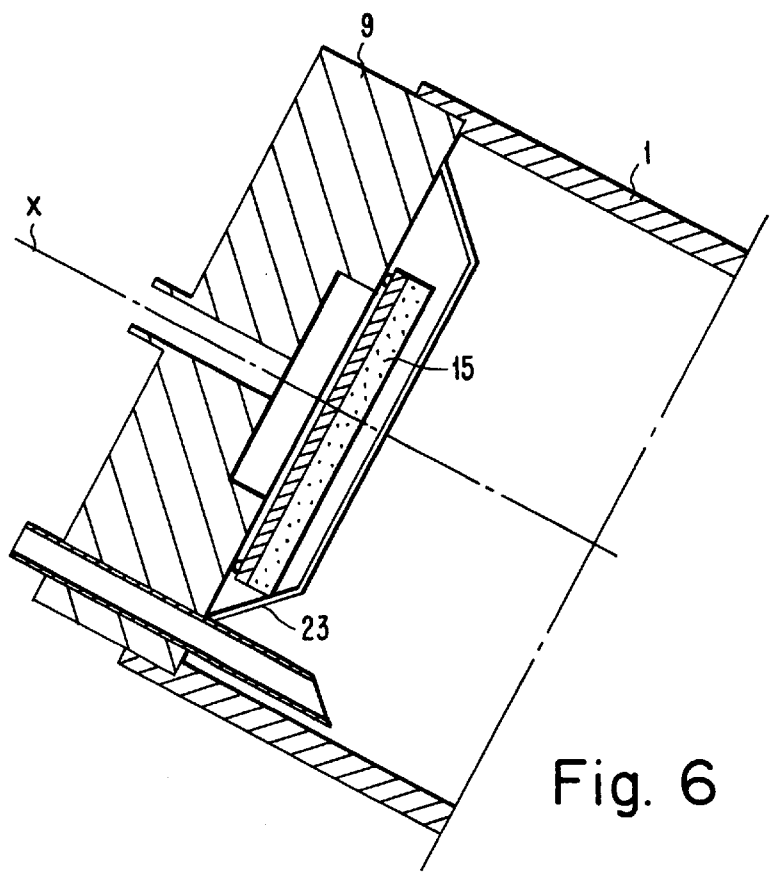
Fig. 6

LEAK-PROOF CONTAINER VALVE DEVICE

TECHNICAL FIELD OF THE INVENTION AND PRIOR ART

The present invention relates to a valve device.

Vacuum cleaners are widely used for suction of dust and relatively small particles. It is also known to use vacuum cleaners for the suction of liquids, such as water or liquids containing one or more cleaning agents. Such vacuum cleaners require a container or the like suitable for containing the liquid so sucked. However, such known containers, frequently provided with wheels facilitating the transport thereof, are not very stable and therefore they accidentally may turn upside down, thereby letting out the liquid contained therein. Moreover, when the container is filled or almost filled, merely a small movement of the container may lead to liquid leakage.

Many attempts have been made to overcome these problems and there have been proposed different valve mechanisms for preventing the liquid leakage from the container. However, the mechanisms proposed are relatively complex and do not function satisfactorily.

SUMMARY OF THE INVENTION

The object of the present invention is to overcome the problems, stated above and to provide a valve device which permits a gas flow but prevents the passage of liquids. More specifically such a valve device should function in a reliable manner and have a structure of low complexity.

This object is obtained by the valve device according to the present invention. By such support means provided to support the disk beneath said orifice at a distance from said surface a free flow of gas is permitted when the valve device is in a normal working position. Moreover, since the disk is movable to abut said surface when the direction of the passage deviates from said essentially vertical direction by a predetermined angle, any flow of a liquid occurring due to the inclination of the container is effectively hindered.

According to an embodiment of the present invention, the support means comprises rest means provided to support the disk such that it is essentially horizontal when the valve device is in said normal working position. In such a horizontal orientation the free gas flow is guaranteed and the gas flow influences; on the disk are minimized. Thereby, the support means may comprise an inclined guide means adapted to guide the disk against said surface when said direction deviates by said predetermined angle from the essentially vertical direction. This means that the disk may be in the form of a completely freely supported disk which is appropriately positioned due to its own weight. Preferably, the guide means is provided to form an upwardly inclined guide surface in all directions perpendicular to said direction (x).

According to a further embodiment of the present invention, the support means comprises a flexible means, the disk being suspended in the flexible means. By such a very uncomplicated construction, the disk is simply hanging down in said flexible means. Thereby, the flexible means may permit the disk to move upwards and sidewards along a curved path. This means that the only restriction the flexible means puts on the movement of the disk is that the disk may not be moved in a direction away from the surface, i.e. the flexible means may not be prolonged. Thereby, the flexible means may comprise at least one wire means.

According to a further embodiment of the present invention, the valve disk in said normal working position is disposed at such a distance from said surface that the total free, flow area between the disk and said surface is at least equal to the smallest cross-section area of the passage. Thereby, the gas inflow into the passage will never be less than the gas outflow therefrom, which means that the disk will not be sucked towards the surface merely because of a suction flow in the passage. Preferably, a cross-section of the passage is decreasing from the one end towards a second end of the passage. Thereby, the total free, flow area between the disk and said surface may be increased, such that the disk may be provided more closely to the surface in said normal working position. This means that the deviation from said essentially vertical direction, which is necessary for closing said passage may be reduced.

According to a further embodiment of the present invention, said passage is extending through a wall device.

According to a further embodiment of the present invention, the valve disk comprises a floating body adapted to force the disk against said surface if the container is filled with a liquid, such as water, above a predetermined level. Thereby, it is prevented that liquid will enter the passage if the container is overfilled.

According to a further embodiment of the present invention, a second end of the passage is connected to a suction pump, preferably of a vacuum cleaner. Thereby, the disk may have a weight which is sufficient to withstand the upward force produced by the suction pump.

According to a further embodiment of the present invention, a sealing means is provided on at least one of the disk and said surface, thereby improving the closing function of the valve device.

The present invention may according to a preferred embodiment be applied to a cleaning device comprising a suction pump, a container and a suction nozzle, with a valve device provided between the suction pump and the container.

BRIEF DESCRIPTION OF THE DRAWINGS

The present invention will now be explained more closely by the description of different embodiments thereof and with reference to the drawings, of which FIG. 3 shows a sectional view of a valve device according to a second embodiment of the present invention, and FIG. 4 shows a sectional view of a valve device according to a third embodiment of the present invention.

FIG. 5 shows a sectional view of the valve device in FIG. 2 in a closed position.

FIG. 6 shows a sectional view of the valve device in FIG. 3 in a closed position.

DETAILED DESCRIPTION OF DIFFERENT EMBODIMENTS

Figure 1:
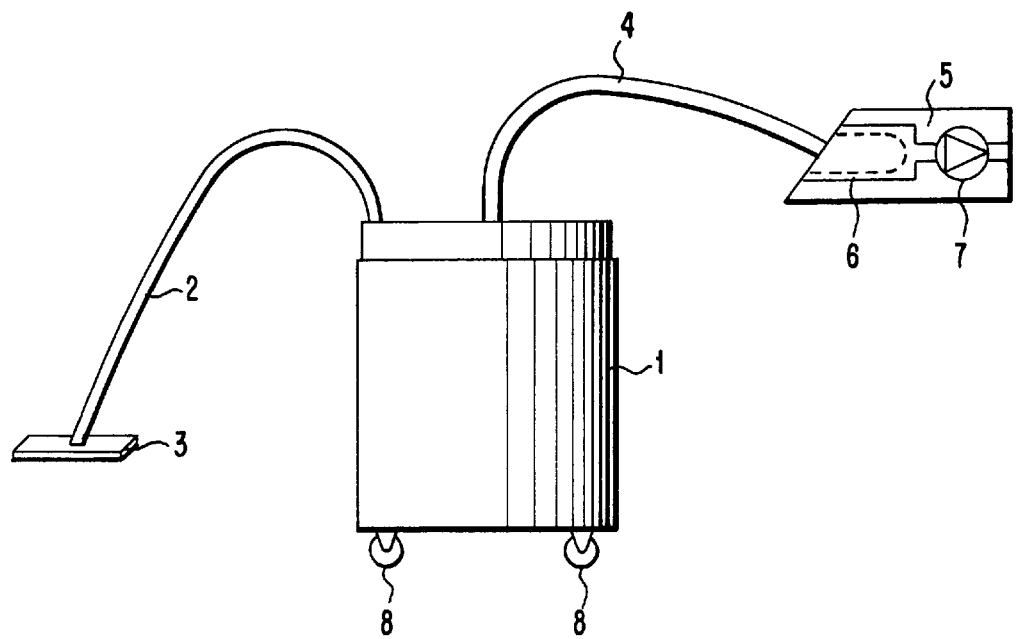
FIG. 1 shows a view of a cleaning device according to the present invention.

FIG. 1 discloses a cleaning device comprising a container 1 connected to an inlet conduit 2 having a suction nozzle 3 and to an outlet conduit 4 which is connected to a vacuum cleaner 5 comprising a filter 6 and a suction pump 7. The container 1 comprises wheels 8 for facilitating the transport thereof and has an upper wall device 9 for the connection of the inlet and outlet conduits 2, 4. It should be noted that the vacuum cleaner 5 also may be provided directly on the upper wall device 9, thereby forming an integrated part of the container 1.

Figure 2:
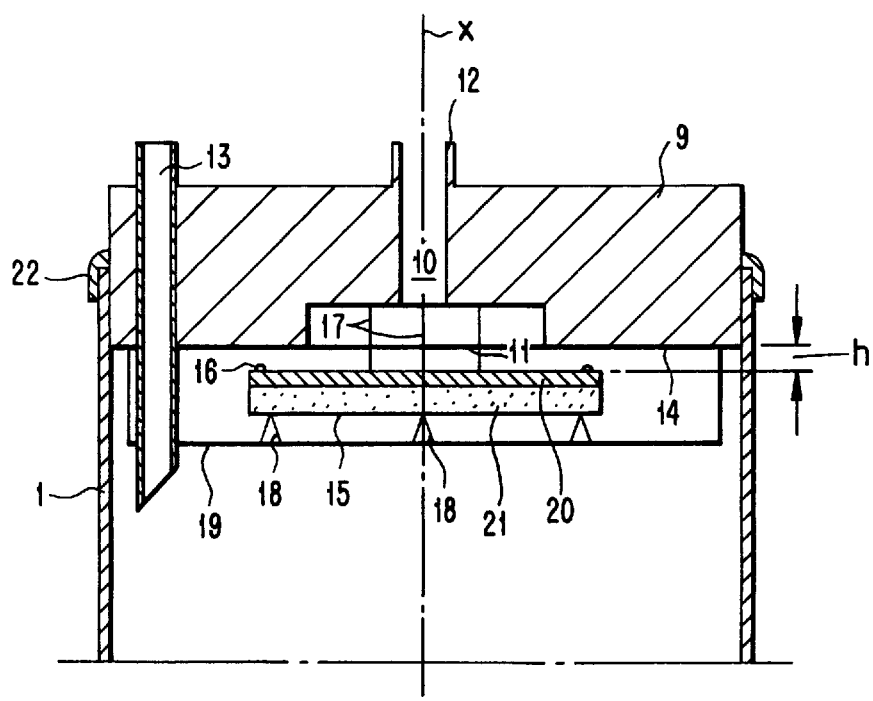
FIG. 2 shows a sectional view of a valve device according to a first embodiment of the present invention.

With reference to FIG. 2, the upper wall device 9 comprises a passage 10 extending through the upper wall device 9 in a direction x being essentially vertical when the container 1 is in a normal working position, as disclosed in FIGS. 2 to 4. The passage 10 has a first end 11 facing the interior of the container 1 and a second end 12 defined by an outlet nipple adapted to be connected to the outlet conduit 4. The upper wall device 9 also comprises an inlet passage 13 comprising a tube extending through the upper wall device 9. The outer end of the tube is adapted to be connected to the inlet conduit 2 and the inner end of the tube 13 is open to the interior of the container 1. The first end 11 of the passage 10 forms an orifice in an inner surface 14 of the upper wall device 9. The surface 14 surrounds the orifice 11. Beneath the orifice 11 there is provided a valve disk 15 adapted to close the passage 10. As may be seen from FIG. 2 the valve disk 15 comprises a sealing ring 16 extending circumferentially around the orifice 11. In the embodiment disclosed in FIG. 2, the valve disk 15 is suspended in flexible means 17 comprising three flexible wires. The wires 17 are flexible in such a manner that the valve disk 15 may swing sidewardly and upwardly along a curved path to abutment against the surface 14 and the sealing ring 16. In a normal working position the valve disk 15 rests upon a support means 18, which in the embodiment disclosed in FIG. 2 comprises three support points carried on a bar arrangement 19. The support points and the bar arrangement 19 are disposed such that the valve disk 15 is essentially horizontal when the valve device is in its normal working position. The bar arrangement 19 is fixed to the upper wall device 9. The valve disk 15 comprises an upper part 20, being of a relatively heavy material, for example metal or plastic material, and a lower part 21 being of a relatively light material and functioning as a floating body for the valve disk 15. Thereby, in case the liquid level in the container 1 reaches the valve disk 15, the disk 15 will float thereon and the sealing ring 16 will be pressed against the surface 14. The upper wall device 9 is attached to the container 1 by hooklike means 22 provided on the peripheral surface of the upper wall device 9. In order to obtain a tight connection between the upper wall device 9 and the container 1 the hooklike means 22 may extend completely around the peripheral surface of the upper wall device 9.

FIG. 3 discloses another embodiment of the upper wall device 9. It should be noted that elements having a corresponding function have been provided with the same reference signs in all embodiments disclosed. The embodiment disclosed in FIG. 3 differs from the one disclosed in FIG. 2 in that the flexible means 17 has been dispensed with and in that the support means 18 comprises a bar arrangement 19 forming an essentially horizontal rest surface and having inclined guide means 23. This guide means 23 is provided to surround the horizontal rest surface of the bar arrangement and offers an upwardly inclined ramp surface for the valve disk 15 in all directions perpendicular to the direction x.

Moreover, in the embodiment of FIG. 3 the upper wall device 9 is inserted in the container to rest against a shoulder 24.

In FIG. 4 the flexible means 17 comprises merely one wire means. Of course, the flexible means 17 may also comprise e.g. two, four or any suitable number of wire means. The support means 18 comprises a net structure, for example a metal wire netting. The net structure 18 is fixed to the inner wall of the container 1. Such a net structure also will function as a filter for relatively big particles. In the embodiment of FIG. 4, the upper wall device 9 is supported by the upper edge of the container 1. Moreover, the upper relatively heavy part 20 of the valve disk 15 is provided at a distance from the lower floating part 21 by means of distance bars connecting the parts 21, 22. This is advantageous if the container is filled with a small amount of liquid and has been turned upside-down.

FIGS. 2 to 4 disclose the valve device in a normal working position, i.e. the passage 10 and the direction x is extending substantially vertically and the valve disk 15 is supported in a substantially horizontal plane. The valve disk 15 is disposed at a distance h from the surface 14. The distance h is such that the total free, flow area between the valve disk 15 and the surface is at least equal to the smallest cross-section area of the passage 10. This total free, flow area is measured where it has its smallest value, i.e. at the corner formed by the passage 10 and the surface 14. As may be seen from FIGS. 2 to 4, the cross-section area of the passage 10 is decreasing from the first end 11 to the second end 12. As a consequence, said free, flow area will increase, which means that the distance h may be reduced. It should be noted that if the sealing ring 16 projects from the upper surface of the valve disk 15 more than a determined length, the distance between the sealing ring 16 and the surface 14 may determine said free, flow area. When the passage 10 is connected to a suction pump 7 air will be drawn in between the surface 14 and the valve disk 15. The valve disk 15 will not be influenced thereby but rest immovable on the support means 18. The friction against the support means 18 reduces small vibrations and noise which otherwise may occur due to the flow of air and due to vibrations in the environment. The decrease of the cross-section area of the passage 10 may be step-wise, see FIGS. 2 and 3, or continuous, see FIG. 4.

FIGS. 5 and 6 disclose the valve device when the container 1 has been brought out of its normal working position and thus the passage 10 is extending in a direction forming an angle v in relation to a vertical axis. As may be seen the valve disk 15 is thereby forced to abut the surface 14 and the sealing ring 16, thereby effectively sealing of the passage 10 such that no liquid may enter the passage 10, the outlet conduit 4 and the suction pump 7. Due to the suspension mechanism disclosed, merely a small deviation angle of the direction x from the vertical will move the valve disk 15 to abutment against the surface 14. Moreover, it should be noted that if the direction x only deviates an angle smaller than the angle v from the vertical, this may result in such a reduction of said free, flow area that the suction force of the pump 7 is sufficient to close the valve device.

The present invention is not limited to the embodiments disclosed but may be modified and varied within the scope of the appended claims. For example, the inlet conduit 2 may, as disclosed, be connected to the container 1 through the upper wall 9 but may also extend through a side wall. The flexible means 17 may comprise a bar connected to the upper wall device 9 and the valve disk 15 by means of ball joints or the like permitting rotational movements in all planes. As an alternative, the sealing ring 16 may be provided on the surface 14 instead of the valve disk 15.

I claim:

1. Valve mechanism for a fluid-collection tank comprising:
   a suction nozzle;
   a suction pump;
   a tank connected between the suction nozzle and the suction pump to collect fluids suctioned by the suction nozzle;
   a valve mechanism arranged to prevent fluids collected in the tank from leaving the tank through a passage in a lid of the tank, the passage being connected to the suction pump and oriented in a direction that is substantially vertical when the tank is in an operating mode, and the passage ending in an aperture that opens into the interior of the tank and is surrounded by a surface, the valve mechanism including a movable valve disk having a diameter greater than a diameter of the aperture of the passage, a supporting device for holding the valve disk at a predetermined vertical distance from the aperture when the tank is in the operating mode, the supporting device permitting the valve disk to be brought in a sealing engagement around the aperture to prevent fluids from escaping from the tank, the supporting device holding the valve disk, when the tank is in the operating mode, relative to the surface surrounding the aperture such that a total free-flow area between the valve disk and the surface is at least as great as a cross-sectional area of the passage and, when the tank is tilted from the operating mode so that the passage forms an angle with a vertical axis, the supporting device cooperates with the valve disk to cause the valve disk to approach the surface as a function of the magnitude of the angle and reduce the free-flow area up to a limiting angle in which the free-flow area is reduced sufficiently such that a suction effect of the suction pump is sufficient to lift the valve disk into a sealing position against the surface, wherein the valve disk includes a float fixedly attached to the valve disk and of sufficient size to lift the valve disk toward the surface when the tank is filled with fluid beyond a predetermined level.

2. Valve mechanism for a fluid collection tank in accordance with claim 1, wherein the supporting device supports the valve disk so that the valve disk is substantially horizontal when the tank is in the operating mode.

3. Valve mechanism for a fluid collection tank in accordance with claim 2, wherein the supporting device includes an inclined guide component that cooperates with the valve disk to direct the valve disk toward the surface when the passage deviates from the vertical axis.

4. Valve mechanism for a fluid collection tank in accordance with claim 3, wherein the supporting device includes flexible means from which the valve disk is suspended relative to the aperture.

5. Valve mechanism for a fluid collection tank in accordance with claim 4, wherein the flexible means includes at least one wire device.

6. Valve mechanism for a fluid collection tank in accordance with claim 2, wherein the supporting device includes flexible means from which the valve disk is suspended relative to the aperture.

7. Valve mechanism for a fluid collection tank in accordance with claim 6, wherein the flexible means includes at least one wire device.

8. Valve mechanism for a fluid collection tank in accordance with claim 2, wherein a cross-sectional area of the passage narrow in a direction away from the aperture towards an opposite end of the passage.

9. Valve mechanism for a fluid collection tank in accordance with claim 2, further comprising a sealing device provided on at least one of the valve disk and the surface and between each of the valve disk and the surface.

10. Valve mechanism for a fluid collection tank in accordance claim 1, wherein the supporting device includes flexible means from which the valve disk is suspended relative to the aperture.

11. Valve mechanism for a fluid collection tank in accordance with claim 10, wherein the flexible means allows the disk to move upward and sideways along a curved track.

12. Valve mechanism for a fluid collection tank in accordance with claim 11, wherein the flexible means includes at least one wire device.

13. Valve mechanism for a fluid collection tank in accordance with claim 10, wherein the flexible means includes at least one wire device.

14. Valve mechanism for a fluid collection tank in accordance with claim 1, wherein a cross-sectional area of the passage narrow in a direction away from the aperture towards an opposite end of the passage.

15. Valve mechanism for a fluid collection tank in accordance with claim 1, further comprising a sealing device provided on at least one of the valve disk and the surface and between each of the valve disk and the surface.

16. Valve mechanism for a fluid collection tank, comprising:
   a suction nozzle;
   a suction pump;
   a tank connected between the suction nozzle and the suction pump to collect fluids suctioned by the suction nozzle;
   a valve mechanism arranged to prevent fluids collected in the tank from leaving the tank through a passage in a lid of the tank, the passage being connected to the suction pump and oriented in a direction that is substantially vertical when the tank is in an operating mode, and the passage ending in an aperture that opens into the interior of the tank and is surrounded by a surface, the valve mechanism including a movable valve disk having a diameter greater than a diameter of the aperture of the passage, a supporting device for holding the valve disk at a predetermined vertical distance from the aperture when the tank is in the operating mode, the supporting device permitting the valve disk to be brought in a sealing engagement around the aperture to prevent fluids from escaping from the tank, the supporting device holding the valve disk, when the tank is in the operating mode, relative to the surface surrounding the aperture such that a total free-flow area between the valve disk and the surface is at least as great as a cross-sectional area of the passage and, when the tank is tilted from the operating mode so that the passage forms an angle with a vertical axis, the supporting device cooperates with the valve disk to cause the valve disk to approach the surface as a function of the magnitude of the angle and reduce the free-flow area up to a limiting angle in which the free-flow area is reduced sufficiently such that a suction effect of the suction pump is sufficient to lift the valve disk into a sealing position against the surface, wherein the supporting device supports the valve disk so that the valve disk is substantially horizontal when the tank is in the operating mode, the supporting device includes an inclined guide component that cooperates with the valve disk to direct the valve disk toward the surface when the passage deviates from the vertical axis, and the guiding component forms an upward leaning guiding area around the aperture.

17. Valve mechanism for a fluid collection tank in accordance with claim 16, wherein the supporting device includes flexible means from which the valve disk is suspended relative to the aperture.

18. Valve mechanism for a fluid collection tank in accordance with claim 7, wherein the flexible means includes at least one wire device.

19. Valve mechanism for a fluid collection tank in accordance with claim 16, wherein the valve disk includes a float of sufficient size to lift the valve disk toward the surface when the tank is filled with fluid beyond a predetermined level.

* * * * *